United States Patent [19]

Häegele

[11] 4,192,143
[45] Mar. 11, 1980

[54] EXHAUST PIPE

[75] Inventor: Gerd Häegele, Winterthur, Switzerland

[73] Assignee: Sulzer Brothers Limited, Winterthur, Switzerland

[21] Appl. No.: 860,965

[22] Filed: Dec. 15, 1977

[30] Foreign Application Priority Data

Dec. 30, 1976 [CH] Switzerland ............... 016459/76

[51] Int. Cl.² ............................................. F01N 7/00
[52] U.S. Cl. ....................................... 60/322; 60/323; 285/114; 285/226; 285/301
[58] Field of Search ................. 60/322, 323; 285/114, 285/301, 226

[56] References Cited

U.S. PATENT DOCUMENTS 1,911,311  5/1933  Ernst .................................. 285/114
2,335,478  11/1943  Bergman ............................ 285/301
3,001,801  9/1961  Downing ............................ 285/114

FOREIGN PATENT DOCUMENTS 392852  5/1933  United Kingdom ................. 60/322

Primary Examiner—Douglas Hart
Attorney, Agent, or Firm—Kenyon & Kenyon

[57] ABSTRACT

An exhaust pipe having an axial compensator is provided with means for preventing bending of the axial compensator. This means includes at least one sleeve which is secured to one of the parts of the pipe and a mandrel slidably received by the sleeve and secured to the other part of the pipe, so as to allow axial movement of the parts. Both sleeve and mandrel may be pivotally secured to the parts to allow adjustment in the angle of inclination relative to the axial compensator.

10 Claims, 3 Drawing Figures

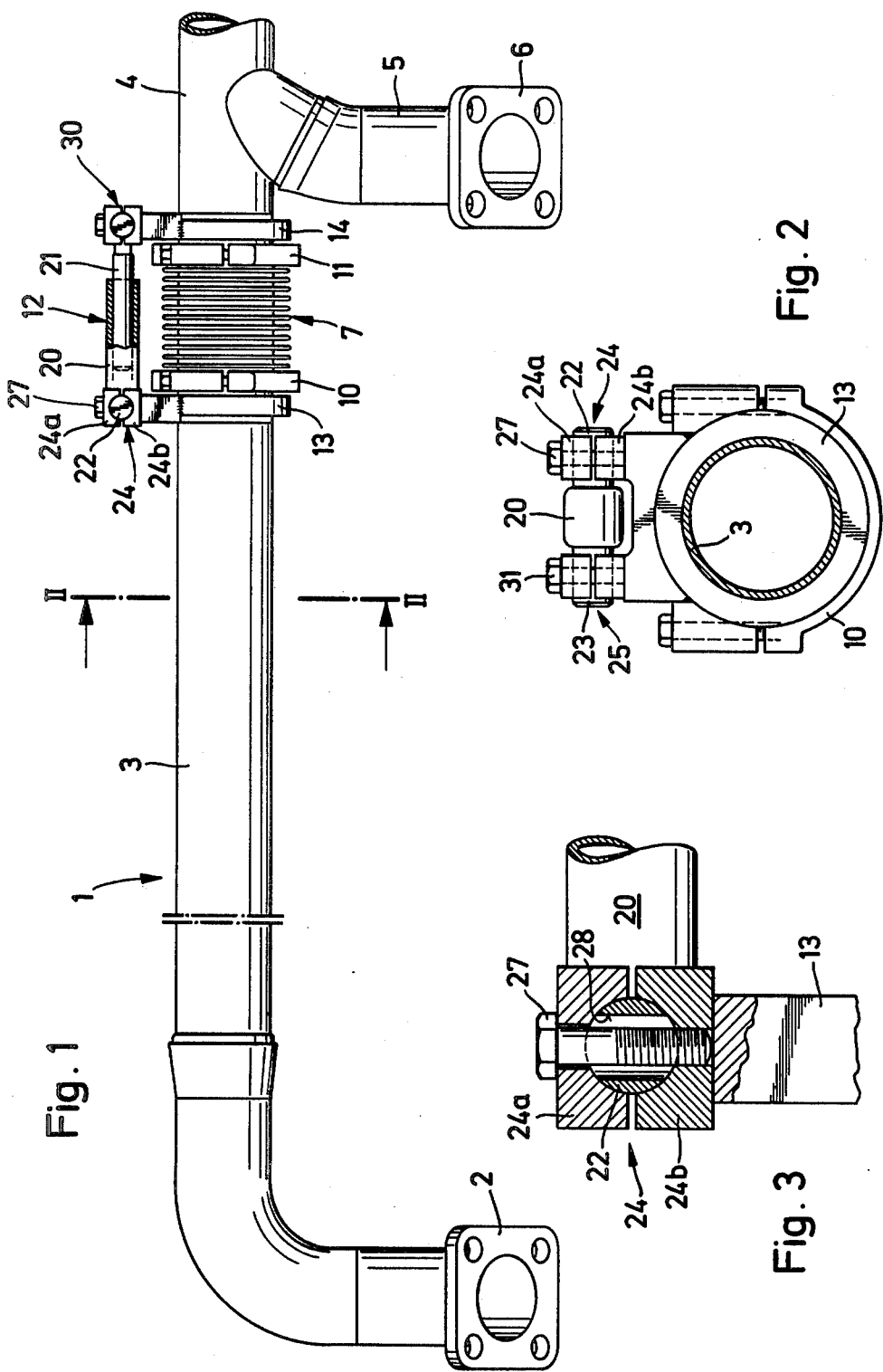

EXHAUST PIPE

This invention relates to an exhaust pipe. More particularly, this invention relates to an exhaust pipe for a reciprocating internal combustion engine, and still more particularly, to an exhaust pipe having an axial compensator therein.

As is known, exhaust pipes for reciprocating internal combustion engines are frequently made with elongated parts which are interconnected by an axial compensator. In such cases, the parts are usually in the form of tubular members which are telescoped together within the axial compensator. In addition, one end of one member is secured at one end of the axial compensator while the opposing end of the other member is secured to the other end of the axial compensator. However, it has been found in practice that such a construction is unsatisfactory under operating conditions wherein the exhaust gases are very hot and there is considerable vibration of the exhaust pipe. This occurs particularly in the case of surge-charged reciprocating internal combusion engines. As a result, the operating life of the connection between the tubular members is relatively short. Furthermore, exhaust pipes of this construction are difficult to fit.

Accordingly, it is an object of the invention to provide an exhaust pipe which is capable of operating under severe conditions of operation.

It is another object of the invention to provide an exhaust pipe which is suitable for use with surge-charged reciprocating internal combustion engines.

It is another object of the invention to provide an exhaust pipe which is simple to fit.

It is another object of the invention to provide an exhaust pipe which is able to compensate for changes in axial length and for vibrations.

Briefly, the invention provides an exhaust pipe which has at least two coaxially disposed parts, an axial compensator connected to and between the parts and a strengthening means for preventing sag in the axial compensator. This strengthening means includes at least one sleeve secured to one of the parts and a mandrel secured to the other of the parts and guided in a respective sleeve.

In addition, in order to compensate for any inaccuracies in fabrication, the inclination of the sleeve and mandrel relative to each other is adjustable. To this end, each of the sleeve and mandrel is adjustably mounted on the respective pipe part via a means which pivotally mounts each of the sleeve and mandrel to the respective pipe part. Such a means includes a pair of pins secured to each of the mandrel and sleeve, a clamp secured to each pipe part to receive a respective pin and a pair of screws which are threaded through the respective clamps for tightening each clamp about a received pin. In addition, each pin is provided with a bore and each screw passes through a bore such that the sleeve or mandrel can be tilted without having to remove the screws.

These and other objects and advantages of the invention will become more apparent from the following detailed description taken in conjunction with the accompanying drawings in which:

FIG. 1 illustrates a front elevational view of an exhaust pipe according to the invention;

FIG. 2 illustrates a view taken on line II—II of FIG. 1; and

FIG. 3 illustrates a partial cross sectional view through a pivot mounting of the mandrel in accordance with the invention.

Referring to FIG. 1, the exhaust pipe 1 is provided with a bent portion at one end and a flange 2 so as to be mounted on a surge-charged reciprocating internal combustion engine (not shown). The opposite end of the pipe 1 extends to a turbo-charger (not shown) for the engine. The pipe 1 is formed of a pair of coaxially disposed parts 3, 4. As shown, one part 3 is relatively long and extends from the initial bent portion while the second part 4 is relatively short and is disposed very near a support point. In this case, the support point is in the form of a bent portion which acts as an exhaust spigot 5 and is secured to the engine by means of a flange 6.

An axial compensator 7 is connected to and between the coaxial parts 3, 4 to permit axial expansion between the parts 3, 4. Such an expansion can be caused by a high temperature of an exhaust gas passing through the pipe 1 or by longitudinal vibrations in the exhaust pipe 1 caused by the exhaust gases. As shown, one end of the compensator 7 is secured by means of a pipe clamp 7 to one part 3 while the other end of the compensator 7 is secured by means of the pipe clamp 11 to the pipe part 4.

A strengthening means 12 is also provided for preventing sag in the axial compensator 7. As shown, this strengthening means 12 bridges over the axial compensator 7 and is disposed outside the compensator 7. Further, the strengthening means 12 is formed by a sleeve 20 which is secured to the pipe part 3 and a mandrel 21 which is secured to the pipe part 4. The mandrel 21 is guided within the sleeve 12, for example, in a slidable relation. Consequently, the compensator 7 can move axially but cannot sag. As shown, the sleeve 20 and mandrel 21 are disposed in a transverse plane of the axial compensator 7, i.e. a plane passing coaxially through the axis of the axial compensator 7.

Referring to FIGS. 1 and 2, the strengthening means 12 is also provided with a means for pivotally mounting the sleeve 20 and mandrel 21 on their respective pipe parts 3, 4. To this end, each of the respective pipe parts is provided with a radial flange 13, 14. Since the pivoting arrangement is similar for both the sleeve 20 and the mandrel 21 only the pivot arrangement for the sleeve 20 will be described in detail. As shown in FIGS. 2 and 3, the pivotally mounting means includes a pair of pins 22, 23 which are secured to one end of the sleeve 20. In addition, a pair of clamps 24, 25 which are comprised of two halves, e.g., 24a, 24b is secured via a suitable support in fixed relation to the radial flange 13 of the pipe part 3. Each of the clamps 24, 25 receives a respective pin 22, 23 therein. Also, a pair of screws 27, 31 are threaded through a respective claim 24, 25 for tightening of the clamps about the received pins. As shown in FIG. 3, each screw, for example, screw 27, passes through a respective bore 28 in a pin 22. This bore 28 is enlarged with respect to the diameter of the screw 27 so as to permit adjustments of the sleeve 20 on the flange 13 without having to remove the screw 27 from the clamp 24.

The means 30 for pivotally mounting the sleeve 21 is similarly constructed and is secured, for example, by welding to the radial flange 14 of the pipe part 4.

In use, before the screws 27, 31 of the strengthening means 12 are tightened, the inclination of the sleeve 20 and mandrel 21 to one another can be adjusted so that their longitudinal axis coincide. Thus, any inaccuracies which occur during fabrication, such as a flange which has been welded on in a slightly askew manner, can be compensated for so that the sleeve 20 and the mandrel 21 extend coaxially of one another as well as in parallel to the longitudinal axis of the axial compensator 7.

In order to avoid abrasion or rust, the inside wall of the sleeve 20 and the surface of the mandrel 21 may be given a surface treatment such as a case-hardening treatment.

It is to be noted that the strengthening means 12 may employ a plurality of sleeve and mandrel units. For example, three such sleeve and mandrel units may be spaced uniformly at 120° about the axial compensator 7.

What is claimed is:

1. In combination,
   an exhaust pipe for a reciprocating internal combustion engine, said pipe having at least two coaxially disposed parts;
   an axial compensator connected to and between said parts to permit relative axial expansion between said parts; and
   strengthening means for preventing sag in said axial compensator, said means including at least one sleeve secured to one of said parts and a mandrel secured to the other of said parts and slidably mounted in a respective sleeve.

2. The combination as set forth in claim 1 wherein each said sleeve and said mandrel is adjustably mounted on said parts to permit adjustment of the axis of a respective sleeve and mandrel relative to each other.

3. The combination as set forth in claim 2 wherein said means further includes means for pivotally mounting each of said sleeve and said mandrel on a respective pipe part, each said pivotally mounting means including a pair of pins secured to one end of each respective mandrel and sleeve, each said pin having a bore extending therethrough, a pair of clamps secured to a respective pipe part and receiving a respective pin therein, and a pair of screws, each said screw being threaded through a respective clamp for tightening said clamp about a received pin, each said screw passing through a respective bore of a respective pin.

4. The combination as set forth in claim 1 wherein each pipe part has a radial flange and wherein said one sleeve is secured to one of said flanges and said mandrel is secured to the other of said flanges.

5. The combination as set forth in claim 1 wherein said pipe parts are telescoped within each other within said axial compensator.

6. In combination,
   an exhaust pipe having at least two coaxially disposed parts and at least a pair of bent parts for mounting said pipe on an engine;
   an axial compensator connected to and between said coaxially disposed parts; and
   means bridging said axial compensator for preventing sag in said axial compensator, said means including a sleeve secured to one of said coaxially disposed parts and a mandrel secured to the other of said coaxially disposed parts and guided in a respective sleeve.

7. The combination as set forth in claim 6 wherein said sleeve and mandrel are disposed in a transverse plane of said axial compensator.

8. The combination as set forth in claim 7 wherein said coaxially disposed pipe parts are telescoped within each other within said compensator.

9. The combination as set forth in claim 8 wherein each coaxial pipe part has a radial flange and wherein said one sleeve is secured to one of said flanges and said mandrel is secured to the other of said flanges.

10. The combination as set forth in claim 9 wherein said sleeve is pivotally mounted on one of said flanges and said mandrel is pivotally mounted on the other of said flanges.

* * * * *